US012581277B2

(12) United States Patent
Nakano et al.

(10) Patent No.: US 12,581,277 B2
(45) Date of Patent: Mar. 17, 2026

(54) VEHICLE-MOUNTED COMMUNICATION DEVICE

(71) Applicant: Mitsubishi Electric Corporation, Tokyo (JP)

(72) Inventors: Hisao Nakano, Tokyo (JP); Masao Iwata, Tokyo (JP); Yasuaki Takimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 162 days.

(21) Appl. No.: 18/701,627

(22) PCT Filed: Nov. 11, 2021

(86) PCT No.: PCT/JP2021/041547
§ 371 (c)(1),
(2) Date: Apr. 16, 2024

(87) PCT Pub. No.: WO2023/084694
PCT Pub. Date: May 19, 2023

(65) Prior Publication Data
US 2024/0422515 A1     Dec. 19, 2024

(51) Int. Cl.
*H04W 4/46*          (2018.01)
*H04W 4/021*        (2018.01)
(52) U.S. Cl.
CPC ............. *H04W 4/46* (2018.02); *H04W 4/022* (2013.01)
(58) Field of Classification Search
CPC ................................. H04W 4/46; H04W 4/022
(Continued)

(56) References Cited

U.S. PATENT DOCUMENTS

| 12,091,006 B2* | 9/2024 | Kobayashi | ............ B60W 30/09 |
| 2012/0078513 A1* | 3/2012 | Oaki | .................. G01C 21/3664 |
| | | | 701/527 |

(Continued)

FOREIGN PATENT DOCUMENTS

| JP | 2012-100024 A | 5/2012 |
| JP | 2015-43477 A | 3/2015 |

(Continued)

OTHER PUBLICATIONS

International Search Report and Written Opinion received for PCT Patent Application No. PCT/JP2021/041547, mailed on Feb. 1, 2022, 12 pages.

*Primary Examiner* — Brian A Zimmerman
*Assistant Examiner* — Thang D Tran
(74) *Attorney, Agent, or Firm* — XSENSUS LLP

(57)          ABSTRACT

The vehicle-mounted communication device includes: a reception unit which receives, from remote vehicles, remote-vehicle messages each including information about a remote-vehicle position; an ego-vehicle information acquisition unit which acquires, as information about an ego vehicle, ego-vehicle information including at least an ego-vehicle position, an ego-vehicle speed, and an ego-vehicle advancing direction; a message processing area determination unit which determines a message processing area on the basis of the ego-vehicle information; a message processing necessity determination unit which acquires the remote-vehicle messages from the reception unit, outputs, as a selected remote-vehicle message, a remote-vehicle message the remote-vehicle position of which is present within the message processing area, and discards a remote-vehicle message the remote-vehicle position of which is present outside the message processing area; and a message processing unit which performs processing on the selected
(Continued)

remote-vehicle message outputted from the message processing necessity determination unit.

12 Claims, 10 Drawing Sheets

(58) Field of Classification Search
USPC ........................................................ 340/988
See application file for complete search history.

(56) References Cited

U.S. PATENT DOCUMENTS

| | | | | |
|---|---|---|---|---|
| 2013/0030681 | A1* | 1/2013 | Basnayake | G08G 1/0112 |
| | | | | 701/119 |
| 2015/0243165 | A1* | 8/2015 | Elsheemy | G08G 1/096775 |
| | | | | 340/906 |
| 2016/0265923 | A1* | 9/2016 | Fukushima | G08G 1/0112 |
| 2017/0018187 | A1* | 1/2017 | Kim | G08G 1/005 |
| 2017/0032402 | A1* | 2/2017 | Patsiokas | G06Q 30/0207 |
| 2019/0164422 | A1* | 5/2019 | Bai | G06V 10/764 |
| 2020/0088830 | A1* | 3/2020 | Kobayashi | G08G 1/096775 |
| 2020/0096359 | A1* | 3/2020 | Sakr | G05D 1/0278 |
| 2020/0096597 | A1* | 3/2020 | Kobayashi | B60W 60/0016 |
| 2020/0180665 | A1* | 6/2020 | Hausmann | B61L 15/0072 |
| 2020/0282981 | A1* | 9/2020 | Wang | B60Q 9/008 |
| 2020/0290631 | A1* | 9/2020 | Higuchi | G06V 20/58 |
| 2020/0307580 | A1* | 10/2020 | Kobayashi | B60W 30/09 |
| 2021/0179095 | A1* | 6/2021 | Penilla | B60W 30/09 |
| 2022/0116820 | A1* | 4/2022 | Avedisov | H04Q 9/00 |
| 2022/0289223 | A1* | 9/2022 | Zhang | G01S 13/931 |
| 2023/0288211 | A1* | 9/2023 | Rech | B60W 60/001 |

FOREIGN PATENT DOCUMENTS

| | | |
|---|---|---|
| JP | 2016-170094 A | 9/2016 |
| JP | 2017-212579 A | 11/2017 |
| JP | 2020-91589 A | 6/2020 |
| WO | 2014/002485 A1 | 1/2014 |

* cited by examiner

VEHICLE-MOUNTED COMMUNICATION DEVICE

CROSS-REFERENCE TO RELATED APPLICATIONS

This application is based on PCT filing PCT/JP2021/041547, filed Nov. 11, 2021, the entire contents of which are incorporated herein by reference.

TECHNICAL FIELD

The present disclosure relates to a vehicle-mounted communication device.

BACKGROUND ART

A large number of vehicle-to-vehicle communication messages are transmitted in a situation where the number of vehicles is large, such as a situation involving congestion or traveling in a large city with a large traffic volume. On a reception side, the number of received messages becomes large, and loads of message verification processing and alarm application processing each of which is processing for the received messages increase. Consequently, a failure to process an important message or a delay in the processing might occur, and thus an application such as an alarm might not be operated at an appropriate timing, whereby it might become unable to notify a driver of a possibility of collision. In view of this, a communication device has been proposed in which, in order to decrease a processing load of verification of received information, a degree of importance of a received message is determined on the basis of content of the received message, a packet type flag added to the message, the frequency of reception from the same transmission source, reception power, and the like, determination as to necessity of verification is performed according to the degree of importance, and, when it is determined that the message needs to be verified, verification is performed, whereas, when it is determined that the message does not need to be verified, verification is not performed (see, for example, Patent Document 1).

CITATION LIST

Patent Document

Patent Document 1: Japanese Laid-Open Patent Publication No. 2012-100024

SUMMARY OF THE INVENTION

Problem to be Solved by the Invention

The communication device described in Patent Document 1 has the following problem. That is, a degree of importance is determined by analyzing details of information about a remote vehicle included in the received message, and determination as to necessity of verification is performed, whereby the effect of decreasing the processing load is low.

The present disclosure has been made to solve the above problem, and an object of the present disclosure is to provide a vehicle-mounted communication device in which the processing load for received messages is low.

Means to Solve the Problem

A vehicle-mounted communication device according to the present disclosure includes: a reception unit which receives, from remote vehicles, remote-vehicle messages each including information about a remote-vehicle position indicating a position of a corresponding one of the remote vehicles; an ego-vehicle information acquisition unit which acquires, as information about an ego vehicle, ego-vehicle information including at least an ego-vehicle position, an ego-vehicle speed, and an ego-vehicle advancing direction; a message processing area determination unit which determines a message processing area on the basis of the ego-vehicle information; a message processing necessity determination unit which acquires the remote-vehicle messages from the reception unit, outputs, as a selected remote-vehicle message, a remote-vehicle message the remote-vehicle position of which is present within the message processing area, and discards a remote-vehicle message the remote-vehicle position of which is present outside the message processing area; and a message processing unit which performs processing on the selected remote-vehicle message outputted from the message processing necessity determination unit.

Effect of the Invention

The vehicle-mounted communication device according to the present disclosure includes: a reception unit which receives, from remote vehicles, remote-vehicle messages each including information about a remote-vehicle position indicating a position of a corresponding one of the remote vehicles; an ego-vehicle information acquisition unit which acquires, as information about an ego vehicle, ego-vehicle information including at least an ego-vehicle position, an ego-vehicle speed, and an ego-vehicle advancing direction; a message processing area determination unit which determines a message processing area on the basis of the ego-vehicle information; a message processing necessity determination unit which acquires the remote-vehicle messages from the reception unit, outputs, as a selected remote-vehicle message, a remote-vehicle message the remote-vehicle position of which is present within the message processing area, and discards a remote-vehicle message the remote-vehicle position of which is present outside the message processing area; and a message processing unit which performs processing on the selected remote-vehicle message outputted from the message processing necessity determination unit. Consequently, the processing load for received messages can be made low.

DESCRIPTION OF EMBODIMENTS

Figure 1:
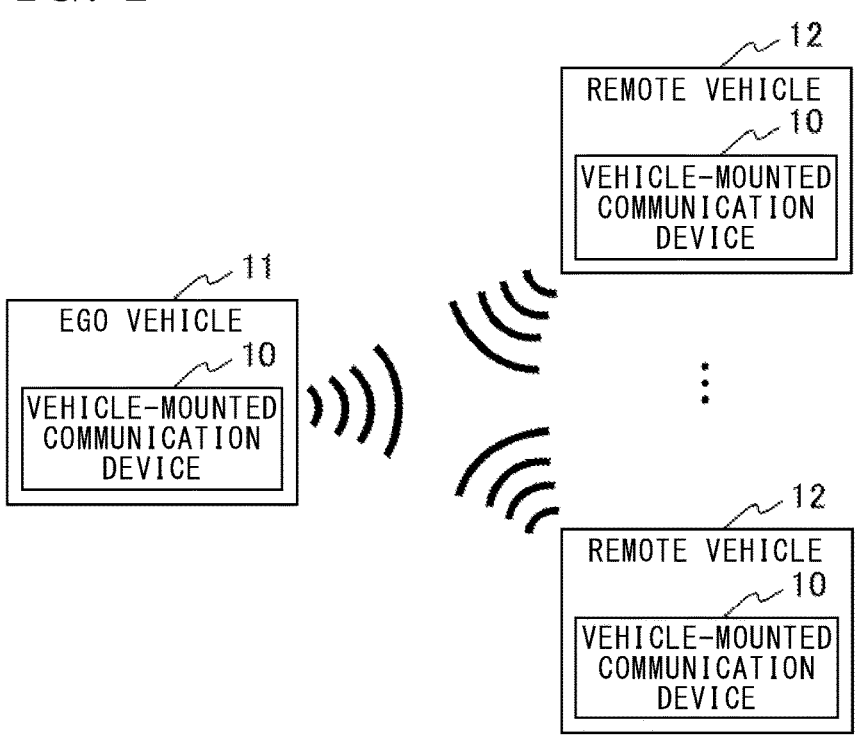
FIG. 1 shows an overall configuration of a wireless communication system including vehicle-mounted communication devices according to embodiment 1.

Hereinafter, vehicle-mounted communication devices according to embodiments for carrying out the present disclosure will be described in detail with reference to the drawings. The same or corresponding constituents in the drawings are denoted by the same reference characters.

Embodiment 1

FIG. 1 shows an overall configuration of a wireless communication system including vehicle-mounted communication devices 10 according to embodiment 1. An ego vehicle (a host vehicle of V2X standard) 11 and remote vehicles 12 are each mounted with a corresponding one of the vehicle-mounted communication devices 10, and the ego vehicle 11 performs wireless communication with a plurality of the remote vehicles 12. Each of the vehicle-mounted communication devices 10 has a vehicle-to-vehicle communication function. The vehicle-mounted communication device 10 mounted on the ego vehicle 11 generates a transmission message from, for example, ego-vehicle information about an ego-vehicle position which is the position of the ego vehicle 11, an ego-vehicle advancing direction which is the advancing direction of the ego vehicle 11, an ego-vehicle speed which is the speed of the ego vehicle 11, and the like. The vehicle-mounted communication device 10 transmits the transmission message to the remote vehicles 12. In addition, the vehicle-mounted communication device 10 receives remote-vehicle messages from the remote vehicles 12 and uses, in various applications, pieces of information about the remote vehicles 12 included in the remote-vehicle messages. The applications include, for example, an application for determining that there is a possibility of collision with any of the remote vehicles 12 and notifying the driver of the possibility.

Figure 2:
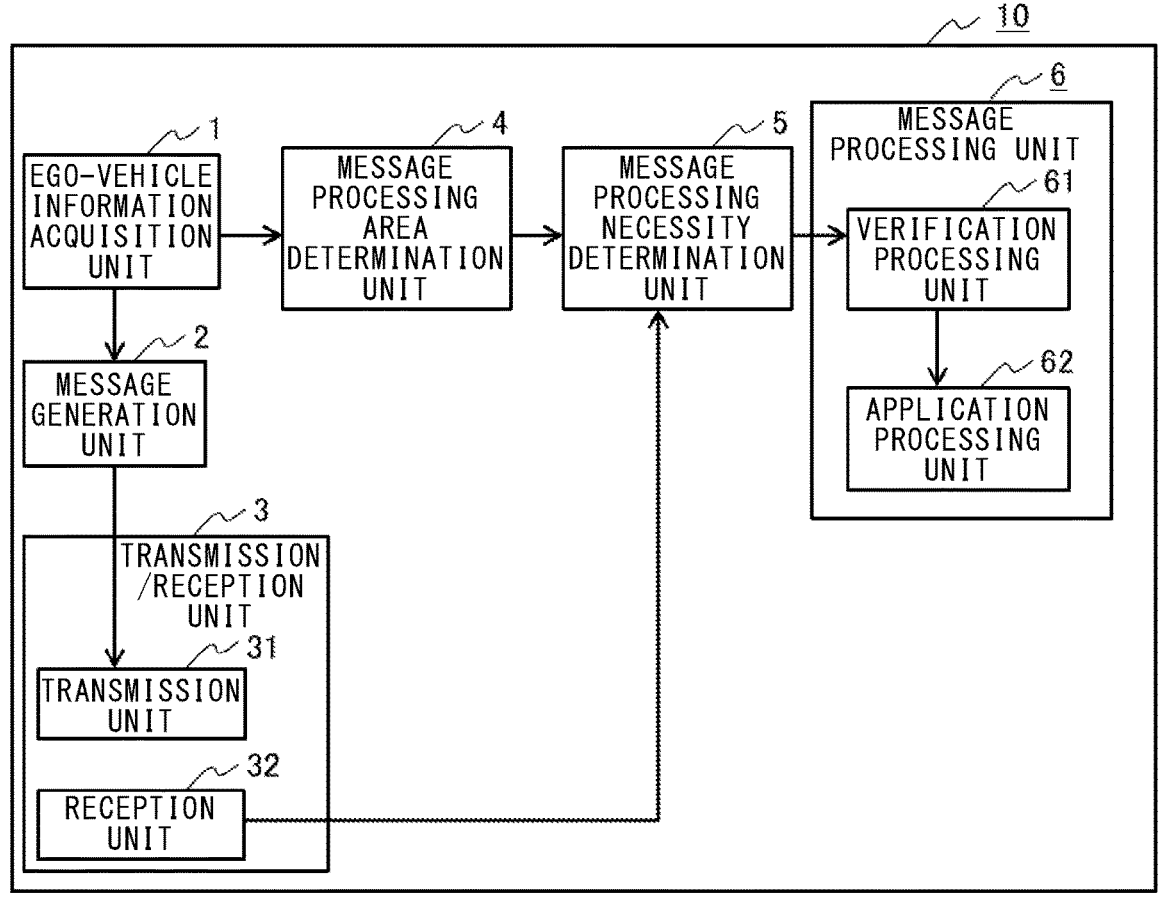
FIG. 2 is a block diagram showing a configuration of each of the vehicle-mounted communication devices according to embodiment 1.

FIG. 2 is a block diagram showing a configuration of the vehicle-mounted communication device 10 according to embodiment 1. The vehicle-mounted communication device 10 includes an ego-vehicle information acquisition unit 1, a message generation unit 2, a transmission/reception unit 3, a message processing area determination unit 4, a message processing necessity determination unit 5, and a message processing unit 6. The transmission/reception unit 3 includes a transmission unit 31 and a reception unit 32, and the message processing unit 6 includes a verification processing unit 61 and an application processing unit 62.

The ego-vehicle information acquisition unit 1 acquires, as information about the ego vehicle 11, ego-vehicle information including at least the ego-vehicle position, the ego-vehicle speed, and the ego-vehicle advancing direction from sensors and outputs the ego-vehicle information to the message generation unit 2 and the message processing area determination unit 4. The ego-vehicle information may include an acceleration, an angular velocity, and the like. The ego-vehicle position is acquired from, for example, a global navigation satellite system (GNSS) receiver. The ego-vehicle speed is acquired from, for example, a vehicle speed sensor. The acceleration is acquired from, for example, an acceleration sensor. The angular velocity is acquired from, for example, a gyro sensor.

The message generation unit 2 creates the transmission message from the ego-vehicle information which is the output from the ego-vehicle information acquisition unit 1. The message generation unit 2 further creates signature data, applies the signature data to the transmission message, and outputs the resultant transmission message to the transmission unit 31 of the transmission/reception unit 3. The transmission unit 31 transmits the transmission message about the ego vehicle 11.

The reception unit 32 of the transmission/reception unit 3 receives, from the remote vehicles 12, remote-vehicle messages each including information about a remote-vehicle position indicating a position of a corresponding one of the remote vehicles 12 and outputs the remote-vehicle messages to the message processing necessity determination unit 5. The message processing area determination unit 4 determines a message processing area on the basis of the ego-vehicle information and outputs the message processing area to the message processing necessity determination unit 5. The message processing necessity determination unit 5 acquires the remote-vehicle messages from the reception unit 32, acquires information about the message processing area from the message processing area determination unit 4, outputs, as selected remote-vehicle messages, remote-vehicle messages the remote-vehicle positions of which are present within the message processing area to the message processing unit 6, and discards a remote-vehicle message the remote-vehicle position of which is present outside the message processing area.

The message processing unit 6 performs processing on the selected remote-vehicle messages outputted from the message processing necessity determination unit 5. The message processing unit 6 includes the verification processing unit 61 and the application processing unit 62. The verification processing unit 61 is for performing verification as to authenticity of each of the selected remote-vehicle messages provided with signatures and outputs, to the application processing unit 62, only a selected remote-vehicle message that has been verified as being authentic. The application processing unit 62 performs processing of an application such as an alarm on the basis of the selected remote-vehicle message.

Figure 3:
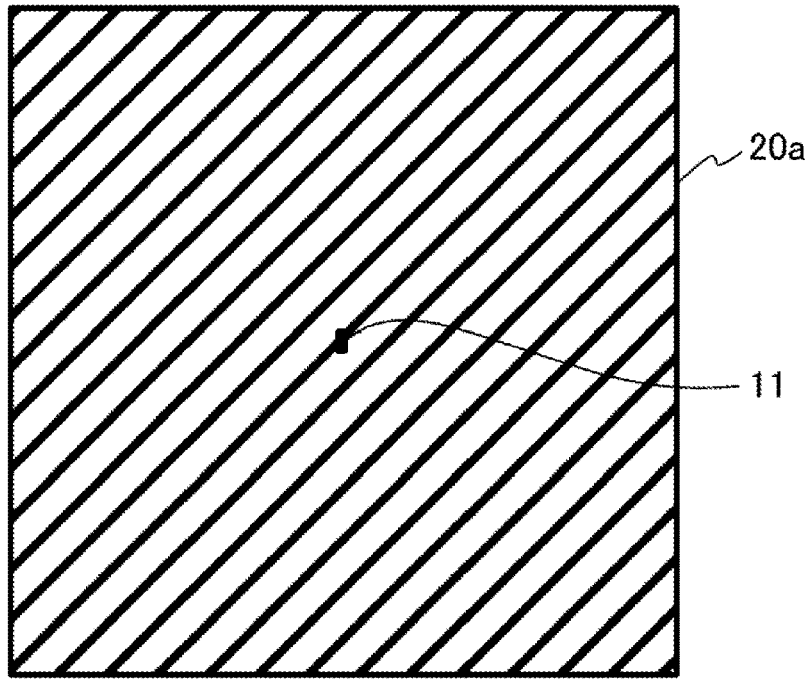
FIG. 3 shows an example of a message processing area in embodiment 1.

Next, operation of the message processing area determination unit 4 will be described. FIG. 3 shows an example of a message processing area 20a determined by the message processing area determination unit 4. FIG. 3 shows a case where the frontward direction of the ego vehicle 11 is the upward direction in FIG. 3. The message processing area 20a shown in FIG. 3 is a region hatched with oblique lines and having a rectangular shape. One side of the rectangular shape is parallel to the front-rear direction of the ego vehicle 11. FIG. 3 shows a message processing area obtained when the ego vehicle 11 is stopped, and the ego vehicle 11 is located at the center of the message processing area 20a.

Figure 4:
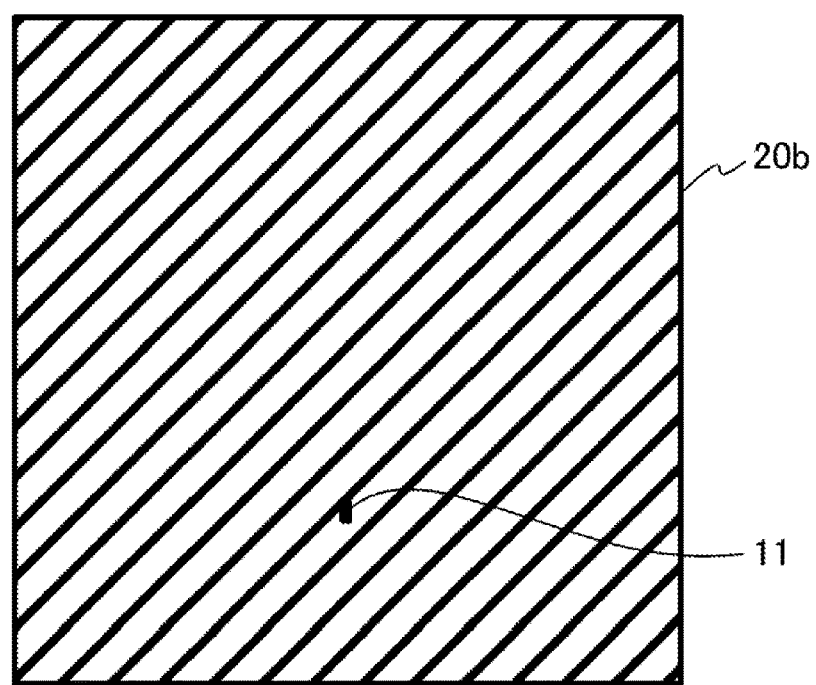
FIG. 4 shows an example of the message processing area in embodiment 1.

FIG. 4 shows an example of another message processing area 20b determined by the message processing area determination unit 4. In FIG. 4, the message processing area 20b obtained when the ego vehicle 11 is advancing in the upward direction in FIG. 4 is indicated as a region hatched with oblique lines, and the ego-vehicle advancing direction which is the advancing direction of the ego vehicle 11 is the upward direction in FIG. 4. Regarding the message processing area 20*b* in FIG. 4, the size of the message processing area at a portion thereof located on the ego-vehicle advancing direction side relative to the ego vehicle 11 is caused to be larger than the size of the message processing area at a portion thereof located on an opposite side to the ego-vehicle advancing direction side relative to the ego vehicle 11. Further, a larger value of the ego-vehicle speed may be set to lead to a larger difference between the size of the message processing area at the portion thereof located on the ego-vehicle advancing direction side and the size of the message processing area at the portion thereof located on the opposite side to the ego-vehicle advancing direction side. The remote vehicle 12 located on the opposite side to the ego-vehicle advancing direction side relative to the ego vehicle 11 has a lower probability of collision than the remote vehicle 12 located on the ego-vehicle advancing direction side relative to the ego vehicle 11. Considering this, the size of the message processing area at the portion thereof located on the opposite side to the ego-vehicle advancing direction side relative to the ego vehicle 11 is decreased, whereby the processing load for received messages can be made low. The size of the entirety of the message processing area 20*b* in FIG. 4 may be caused to be equal to the size of the entirety of the message processing area 20*a* (shown in FIG. 3) obtained when the ego vehicle 11 is stopped.

The ego-vehicle information acquisition unit 1 may further acquire, as ego-vehicle information, information about a total vehicle weight, the number of occupants, or a load amount each of which is weight information about the ego vehicle 11. The information about the number of occupants can be acquired from a seating sensor or an in-vehicle camera or according to the states of seat belts. The load amount can be acquired by a load amount sensor. The message processing area determination unit 4 may acquire the weight information about the ego vehicle 11 from the ego-vehicle information acquisition unit 1 and may cause a larger value of the weight information to lead to a larger difference between the size of the message processing area at the portion thereof located on the ego-vehicle advancing direction side relative to the ego vehicle 11 and the size of the message processing area at the portion thereof located on the opposite side to the ego-vehicle advancing direction side relative to the ego vehicle 11. The feature of causing a larger value of the weight information to lead to a larger difference between the size of the message processing area at the portion thereof located on the ego-vehicle advancing direction side relative to the ego vehicle 11 and the size of the message processing area at the portion thereof located on the opposite side to the ego-vehicle advancing direction side relative to the ego vehicle 11 can address the problem that a heavier weight of the ego vehicle 11 leads to a longer braking distance of the ego vehicle 11, and thus, leads to a higher probability of collision with the remote vehicle 12 located on the ego-vehicle advancing direction side.

In addition, the ego-vehicle information acquisition unit 1 may further acquire, as ego-vehicle information, information about a state of a road surface on which the ego vehicle 11 is traveling. The information about the state of the road surface is acquired from, for example, a road surface state sensor. As the information about the state of the road surface, for example, information for ascertaining whether the road surface is in a state of being dry or wet, a state of being paved or unpaved, or a state of being covered with snow is acquired. The message processing area determination unit 4 acquires the information about the state of the road surface from the ego-vehicle information acquisition unit 1 and may cause the size of the entirety of the message processing area 20*a* shown in FIG. 3 or the size of the entirety of the message processing area 20*b* shown in FIG. 4 obtained when the road surface is in a state of being covered with snow, wet, or unpaved to be larger than the size of the entirety of the message processing area 20*a* or 20*b* obtained when the road surface is in a state of being dry and paved. The feature of causing the size of the entirety of the message processing area obtained when the road surface is in a state of being covered with snow, wet, or unpaved to be larger than the size of the entirety of the message processing area obtained when the road surface is in a state of being dry and paved addresses the problem that, when the road surface on which the ego vehicle 11 is traveling is in a state of being covered with snow, wet, or unpaved, the braking distances of not only the ego vehicle 11 but also the remote vehicles 12 become longer and the probability of collision with the remote vehicles 12 becomes higher than when the road surface is in a state of being dry and paved.

Figure 5:
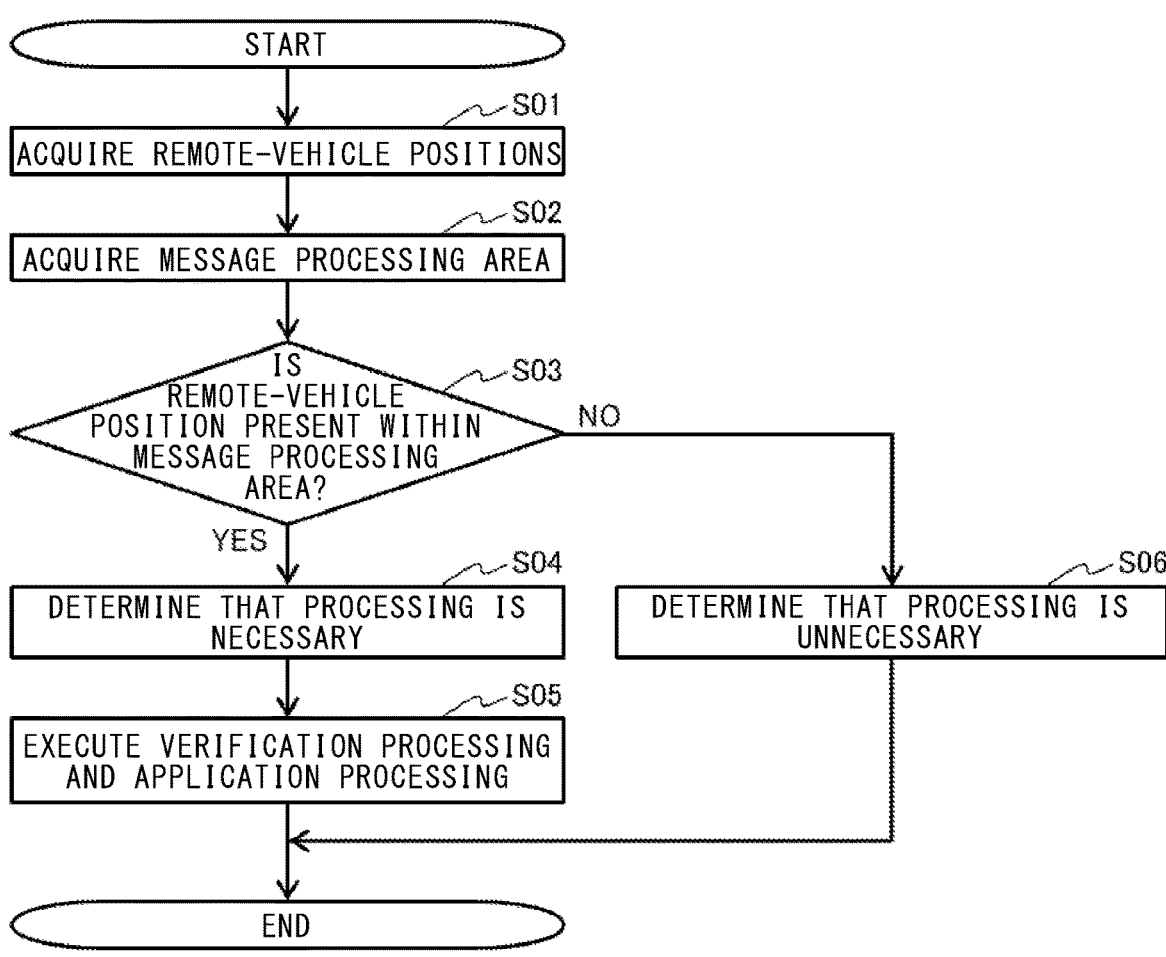
FIG. 5 is a flowchart for explaining operations of a message processing necessity determination unit and a message processing unit in embodiment 1.

Next, operations of the message processing necessity determination unit 5 and the message processing unit 6 will be described. FIG. 5 is a flowchart for explaining operations of the message processing necessity determination unit 5 and the message processing unit 6. In step S01, the message processing necessity determination unit 5 acquires the remote-vehicle messages received from the remote vehicles 12 by the reception unit 32 of the transmission/reception unit 3 and acquires the remote-vehicle position included in each of the remote-vehicle messages, and the process is advanced to step S02. In step S02, the message processing necessity determination unit 5 acquires the information about the message processing area from the message processing area determination unit 4, and the process is advanced to step S03.

In step S03, the message processing necessity determination unit 5 checks whether or not the remote-vehicle position included in the remote-vehicle message is present within the message processing area. In a case where the remote-vehicle position is present within the message processing area, the process is advanced to step S04. Meanwhile, in a case where the remote-vehicle position is not present within the message processing area, the process is advanced to step S06. In step S04, the message processing necessity determination unit 5 determines that processing needs to be performed on the acquired remote-vehicle message, and outputs the acquired remote-vehicle message as a selected remote-vehicle message to the message processing unit 6, and the process is advanced to step S05. In step S05, in the message processing unit 6, the verification processing unit 61 executes verification processing on the selected remote-vehicle message which is the output from the message processing necessity determination unit 5, the application processing unit 62 executes application processing on said selected remote-vehicle message, and the process is ended. Meanwhile, in step S06, the message processing necessity determination unit 5 determines that no processing needs to be performed on the acquired remote-vehicle message, and discards the acquired remote-vehicle message, and the process is ended. In this manner, the message processing necessity determination unit 5 determines whether or not processing needs to be performed on the remote-vehicle message, on the basis of a simple determination criterion as to whether the remote-vehicle position is present within the message processing area, whereby determination processing can be performed with little processing load. Moreover, since the message processing unit 6 performs no processing on a remote-vehicle message determined to be unnecessary to undergo processing, the processing load in the vehicle-mounted communication device 10 can be decreased.

As described above, the vehicle-mounted communication device 10 includes: the reception unit 32 which receives, from the remote vehicles 12, remote-vehicle messages each including information about a remote-vehicle position indicating a position of a corresponding one of the remote vehicles 12; the ego-vehicle information acquisition unit 1 which acquires, as information about the ego vehicle 11, ego-vehicle information including at least an ego-vehicle position, an ego-vehicle speed, and an ego-vehicle advancing direction; the message processing area determination unit 4 which determines a message processing area on the basis of the ego-vehicle information; the message processing necessity determination unit 5 which acquires the remote-vehicle messages from the reception unit 32, outputs, as a selected remote-vehicle message, a remote-vehicle message the remote-vehicle position of which is present within the message processing area, and discards a remote-vehicle message the remote-vehicle position of which is present outside the message processing area; and the message processing unit 6 which performs processing on the selected remote-vehicle message outputted from the message processing necessity determination unit 5. Consequently, the processing load for received messages can be made low.

Embodiment 2

Figure 6:
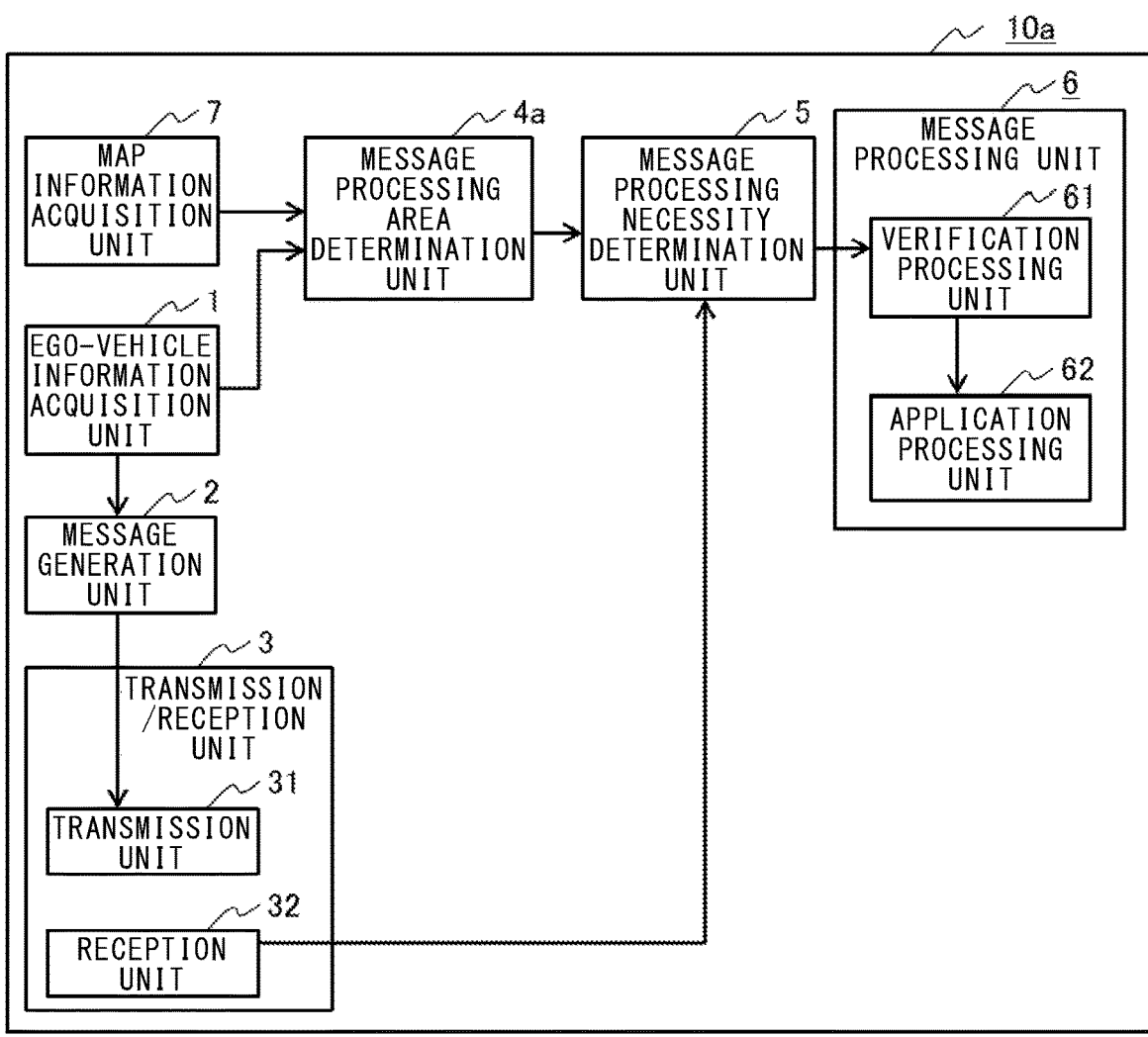
FIG. 6 is a block diagram showing a configuration of a vehicle-mounted communication device according to embodiment 2.

FIG. 6 is a block diagram showing a configuration of a vehicle-mounted communication device 10a according to embodiment 2. The vehicle-mounted communication device 10a according to embodiment 2 shown in FIG. 6 differs from the vehicle-mounted communication device 10 according to embodiment 1 shown in FIG. 2 in that: the message processing area determination unit 4 is replaced with a message processing area determination unit 4a; and a map information acquisition unit 7 is added. The other constituents of the vehicle-mounted communication device 10a according to embodiment 2 are the same as those in the vehicle-mounted communication device 10 according to embodiment 1.

The map information acquisition unit 7 acquires map information about a vicinity of the ego vehicle 11 and outputs the map information to the message processing area determination unit 4a. The map information is acquired from, for example, a map data storage device mounted in the ego vehicle 11. The map information acquisition unit 7 may acquire the map information from outside through communication or the like. The message processing area determination unit 4a determines a message processing area on the basis of the ego-vehicle information acquired from the ego-vehicle information acquisition unit 1 and the map information acquired from the map information acquisition unit 7.

Figure 7:
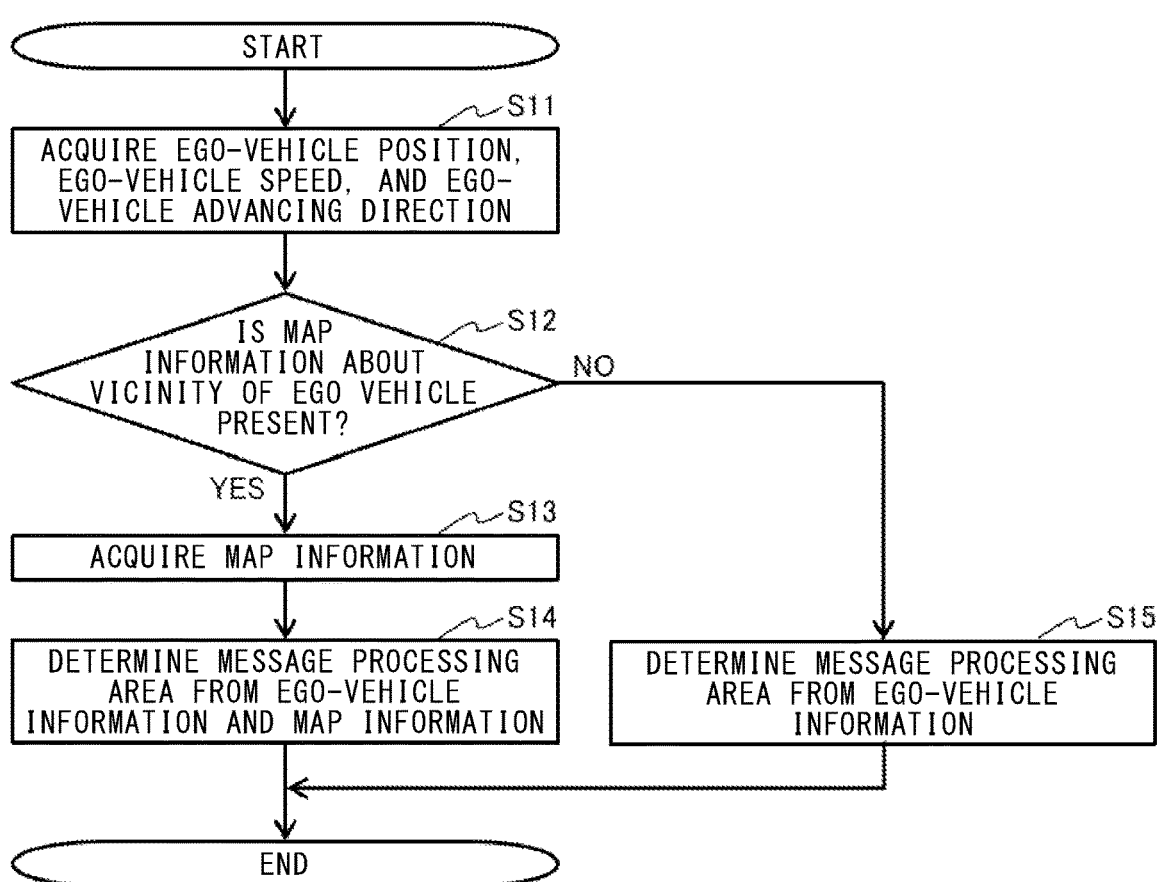
FIG. 7 is a flowchart for explaining operations of an ego-vehicle information acquisition unit, a map information acquisition unit, and a message processing area determination unit in embodiment 2.

FIG. 7 is a flowchart for explaining operations of the ego-vehicle information acquisition unit 1, the map information acquisition unit 7, and the message processing area determination unit 4a in embodiment 2. In step S11, the ego-vehicle information acquisition unit 1 acquires, as information about the ego vehicle 11, the ego-vehicle information including at least the ego-vehicle position, the ego-vehicle speed, and the ego-vehicle advancing direction from the sensors and outputs the ego-vehicle information to the message processing area determination unit 4a, and the process is advanced to step S12.

In step S12, the map information acquisition unit 7 checks whether or not map information about the vicinity of the ego vehicle 11 is present in the map data storage device. In a case where map information about the vicinity of the ego vehicle 11 is present, the process is advanced to step S13. Meanwhile, in a case where no map information about the vicinity of the ego vehicle 11 is present, the process is advanced to step S15. In step S13, the map information acquisition unit 7 acquires the map information about the vicinity of the ego vehicle 11 from the map data storage device and outputs the acquired map information to the message processing area determination unit 4a, and the process is advanced to step S14. In step S14, the message processing area determination unit 4a determines a message processing area on the basis of the ego-vehicle information acquired from the ego-vehicle information acquisition unit 1 and the map information acquired from the map information acquisition unit 7 and outputs information about the message processing area to the message processing necessity determination unit 5, and the process is ended. In step S15, the message processing area determination unit 4a determines a message processing area on the basis of only the ego-vehicle information acquired from the ego-vehicle information acquisition unit 1 and outputs information about the message processing area to the message processing necessity determination unit 5, and the process is ended. The processing by the message processing area determination unit 4a in step S15 may be the same as the processing by the message processing area determination unit 4 described in embodiment 1.

Figure 8:
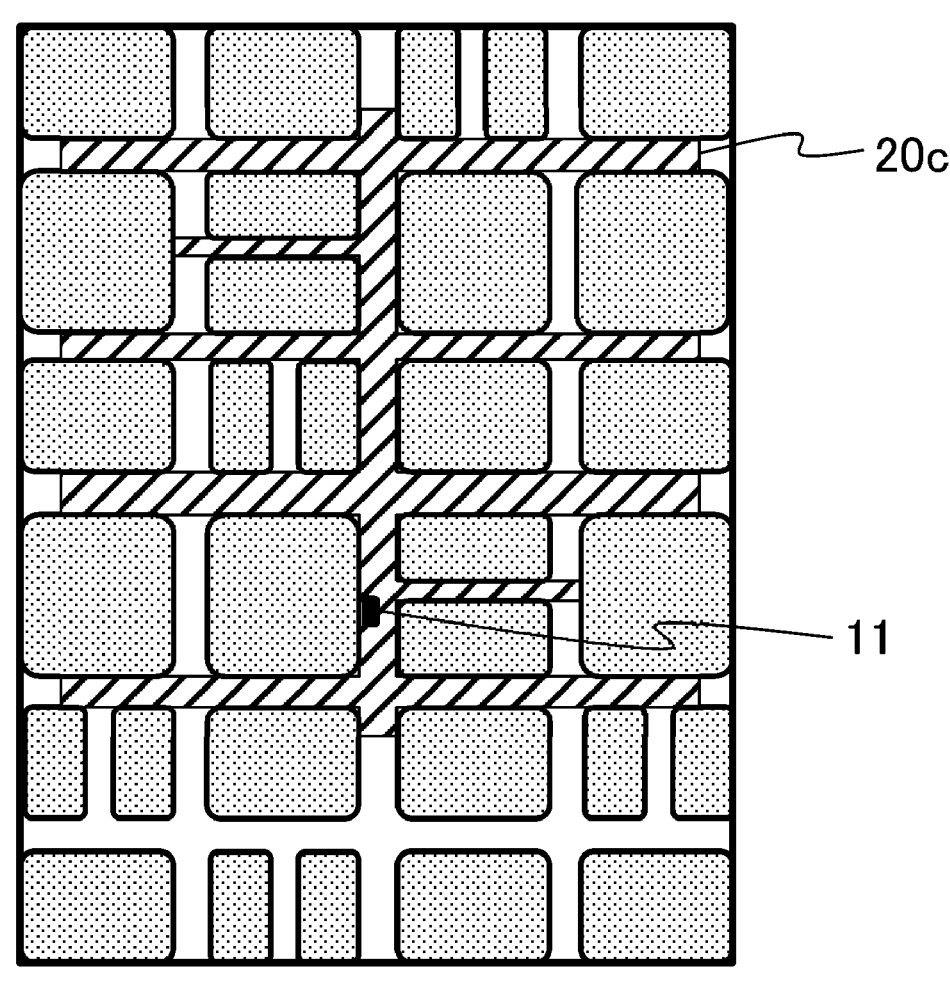
FIG. 8 shows an example of a message processing area in embodiment 2.

FIG. 8 shows an example of a message processing area 20c in embodiment 2. The message processing area 20c shown in FIG. 8 is an example of the message processing area determined in step S14 in FIG. 7. In FIG. 8, white portions indicate roads on which vehicles travel, and dotted portions are regions other than roads and indicate, for example, buildings or the like. Positional information about the roads is acquired from the map information, and the ego vehicle 11 in FIG. 8 indicates the position, of the ego vehicle 11, on the map, the position being based on the information about the ego-vehicle position. A portion hatched with rightward ascending lines indicates the message processing area 20c. In FIG. 8, the message processing area 20c obtained when the ego vehicle 11 is advancing in the upward direction in FIG. 8 is shown, and the ego-vehicle advancing direction which is the advancing direction of the ego vehicle 11 is the upward direction in FIG. 8. In the message processing area 20c in FIG. 8, the size of the message processing area at a portion thereof located on the ego-vehicle advancing direction side relative to the ego vehicle 11 is caused to be larger than the size of the message processing area at a portion thereof located on the opposite side to the ego-vehicle advancing direction side relative to the ego vehicle 11. Further, a larger value of the ego-vehicle speed may be set to lead to a larger difference between the size of the message processing area at the portion thereof located on the ego-vehicle advancing direction side and the size of the message processing area at the portion thereof located on the opposite side to the ego-vehicle advancing direction side. The message processing area determination unit 4a sets, as the message processing area 20c, a traveling road on which the ego vehicle 11 is traveling and an intersecting road intersecting with the traveling road. In FIG. 8, a road on which the ego vehicle 11 is located and that extends in the up-down direction in FIG. 8 is the traveling road, and each of roads intersecting with the traveling road and extending in the left-right direction in FIG. 8 is the intersecting road. Remote vehicles 12 traveling on roads that do not intersect with the traveling road have low probabilities of collision. Considering this, the roads that do not intersect with the traveling road are excluded from the message processing area 20c, whereby the processing load for received messages can be made low.

Figure 9:
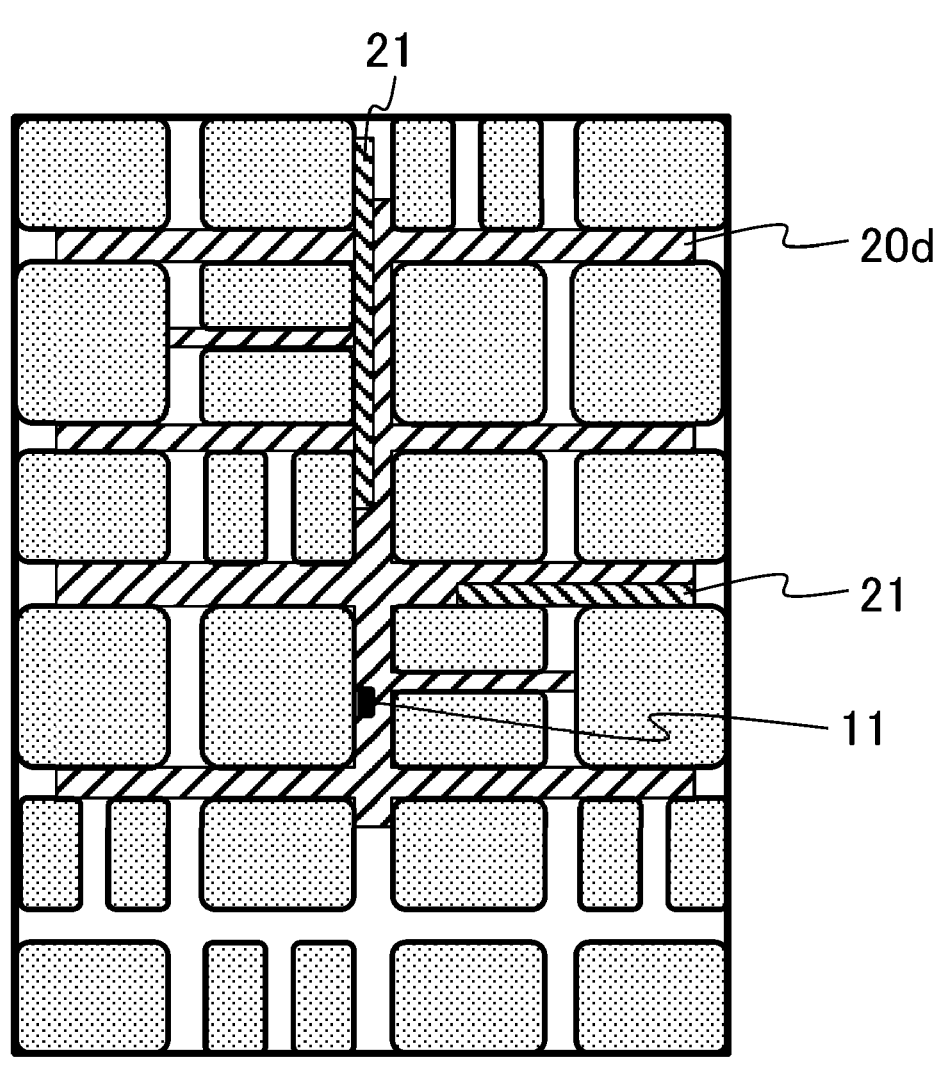
FIG. 9 shows an example of the message processing area in embodiment 2.

FIG. 9 shows another example of the message processing area in embodiment 2. A message processing area 20d shown in FIG. 9 is an example of the message processing area determined in step S14 in FIG. 7. A portion hatched with rightward ascending lines indicates the message processing area 20d, and portions hatched with rightward descending lines indicate congested areas 21. The map information acquisition unit 7 acquires map information including information about the congested areas 21 in step S13 in FIG. 7. In the example shown in FIG. 9, when the ego-vehicle position is outside the congested areas 21, the traveling road and the intersecting roads from which the congested areas 21 have been excluded are set as the message processing area 20d. When the ego-vehicle position is outside the congested areas 21, there is a low probability of collision with remote vehicles 12 within the congested areas 21. Considering this, the congested areas 21 are excluded from the message processing area 20d, whereby the processing load for received messages can be made low.

Figure 10:
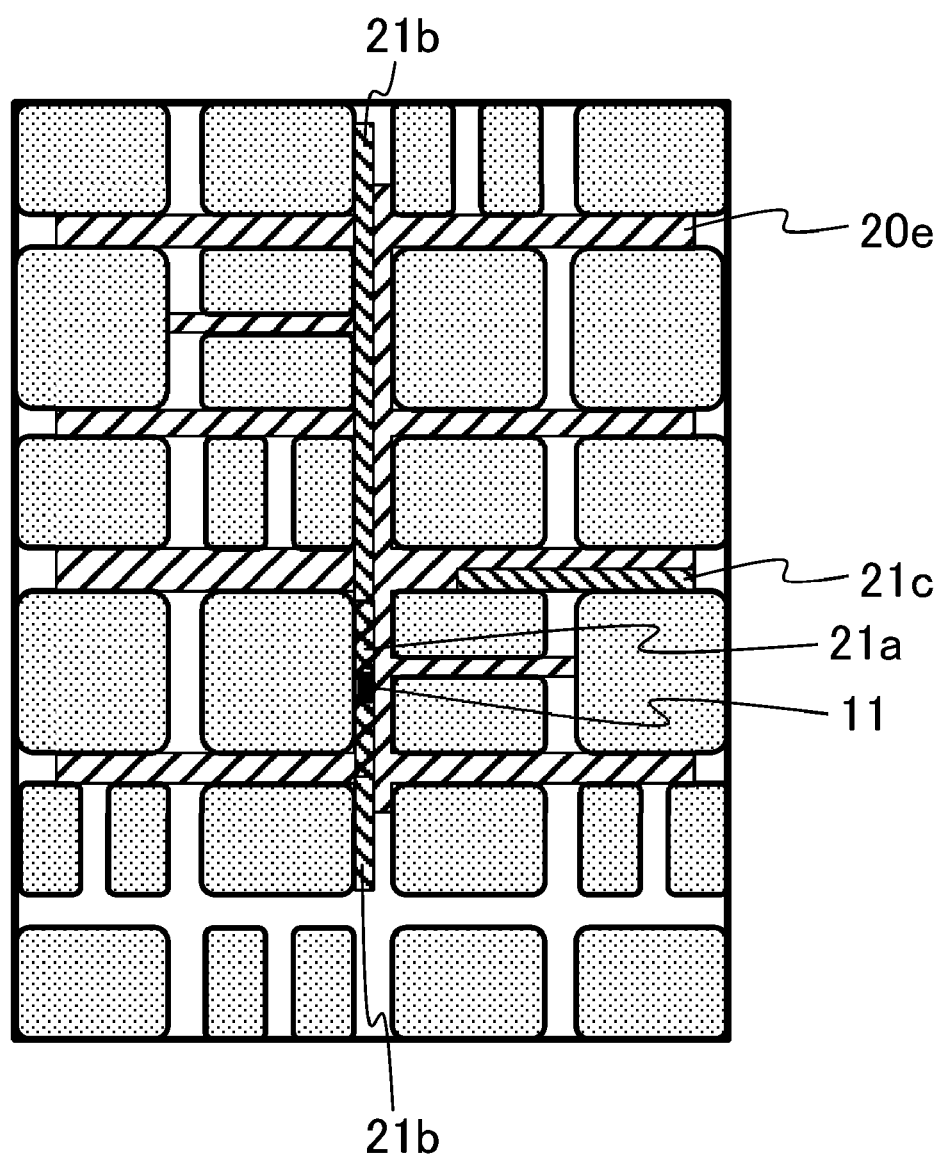
FIG. 10 shows an example of the message processing area in embodiment 2.

FIG. 10 shows another example of the message processing area in embodiment 2. A message processing area 20e shown in FIG. 10 is an example of the message processing area determined in step S14 in FIG. 7. A portion hatched with rightward ascending lines indicates the message processing area 20e. Portions hatched with rightward descending lines indicate congested areas. The map information acquisition unit 7 acquires map information including information about the congested areas in step S13 in FIG. 7. In the example shown in FIG. 10, ego-vehicle vicinity congested areas 21a indicate congested areas as ranges that are present on the traveling road and that are closer to the ego vehicle 11 than positions away from the ego vehicle 11 by a predetermined distance are, traveling road congested areas 21b indicate congested areas as ranges that are present on the traveling road and that are farther from the ego vehicle 11 than the positions away from the ego vehicle 11 by the predetermined distance are, and an intersecting road congested area 21c indicates a congested area that is present on an intersecting road. The ego-vehicle vicinity congested areas 21a are indicated by the rightward ascending lines and the rightward descending lines in a superposed manner. This means that the ego-vehicle vicinity congested areas 21a are included in the message processing area 20e. The probability of collision with remote vehicles 12 within the ego-vehicle vicinity congested areas 21a as the ranges that are present on the traveling road and that are closer to the ego vehicle 11 than the positions away from the ego vehicle 11 by the predetermined distance are, is not low. Considering this, the ego-vehicle vicinity congested areas 21a are included in the message processing area 20e. Meanwhile, the probability of collision with remote vehicles 12 within the traveling road congested areas 21b as the ranges that are present on the traveling road and that are farther from the ego vehicle 11 than the positions away from the ego vehicle 11 by the predetermined distance are, is low, and the probability of collision with remote vehicles 12 within the intersecting road congested area 21c which is present on the intersecting road is low. Considering this, the traveling road congested areas 21b and the intersecting road congested area 21c are excluded from the message processing area 20e, whereby the processing load for received messages can be made low.

Figure 11:
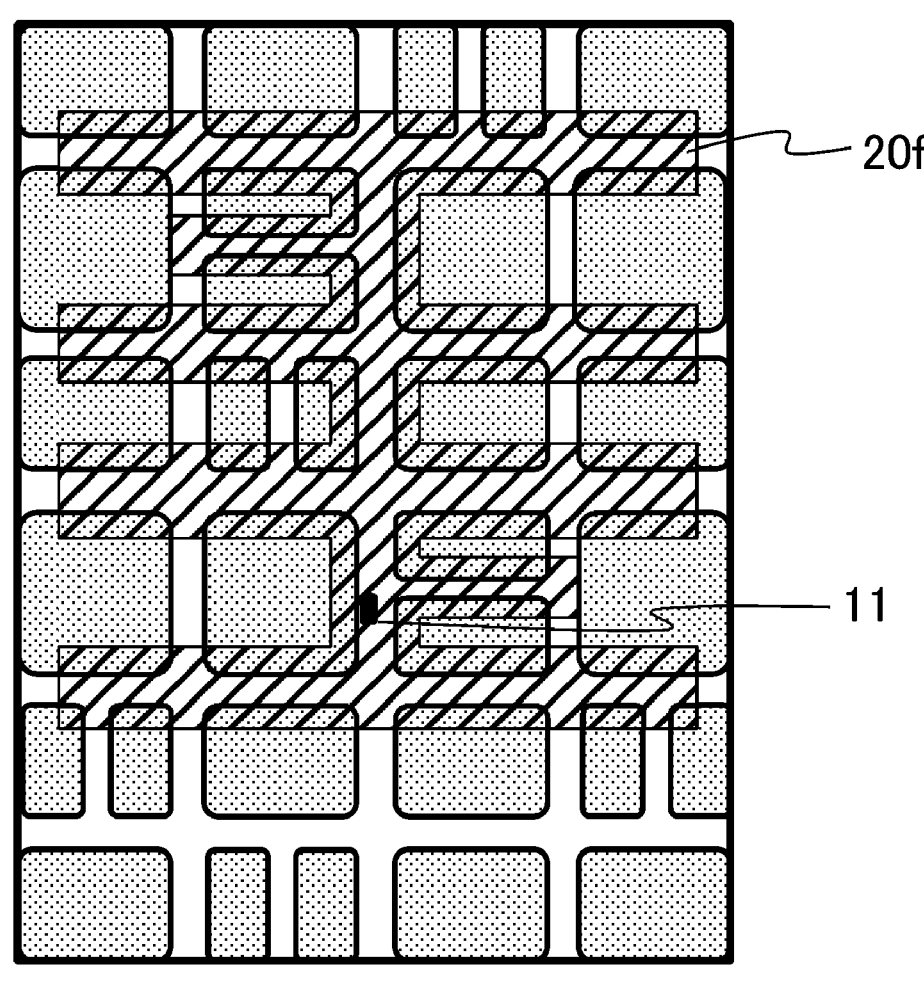
FIG. 11 shows an example of the message processing area in embodiment 2.

FIG. 11 shows another example of the message processing area in embodiment 2. A message processing area 20f shown in FIG. 11 is an example of the message processing area determined in step S14 in FIG. 7. In the example shown in FIG. 11, a range obtained by extending each of the traveling road and the intersecting roads by a predetermined width is set as the message processing area 20f. Since the range obtained by extending each of the traveling road and the intersecting roads by the predetermined width is set as the message processing area 20f, transmission messages from remote vehicles 12 entering the road from near the road can be processed.

Figure 12:
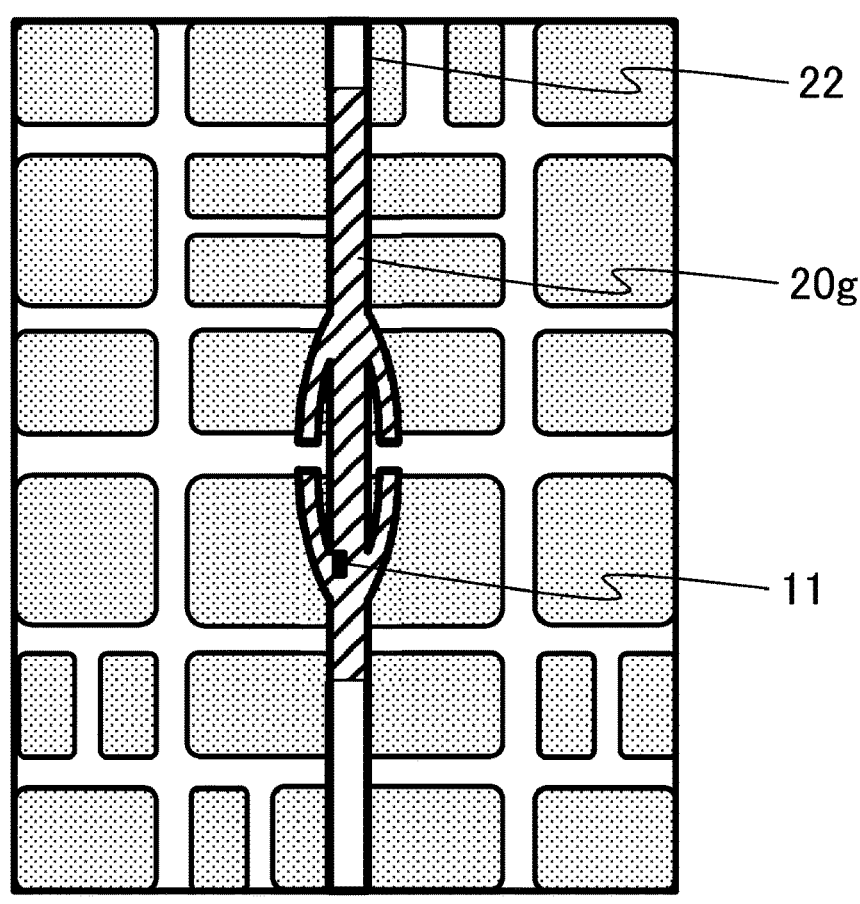
FIG. 12 shows an example of the message processing area in embodiment 2.

FIG. 12 shows another example of the message processing area in embodiment 2. A message processing area 20g shown in FIG. 12 is an example of the message processing area determined in step S14 in FIG. 7. In the example shown in FIG. 12, the ego vehicle 11 is traveling on an expressway 22. The expressway 22 may be a road dedicated to automobiles. The expressway 22 does not intersect with general roads. Thus, in the example shown in FIG. 12, the expressway 22 which is the traveling road and connecting roads connected at junctions to the expressway 22 are set as the message processing area 20g. In this manner, when the ego vehicle 11 is traveling on the expressway 22, the expressway 22 which is the traveling road and the connecting roads connected at the junctions to the expressway 22 are set as the message processing area 20g. Consequently, transmission messages from remote vehicles 12 traveling on the general roads can be excluded from the processing target, whereby the processing load for received messages can be made low.

When the road on which the ego vehicle 11 is traveling has a central reservation, the message processing area determination unit 4a may set, as the message processing area, an advancing-direction lane for traveling in the ego-vehicle advancing direction on the road on which the ego vehicle 11 is traveling and connecting roads intersecting with or connected to the advancing-direction lane. By setting the advancing-direction lane and the connecting roads as the message processing area, transmission messages from remote vehicles 12 traveling in the opposite lane relative to the road on which the ego vehicle 11 is traveling can be excluded from the processing target, whereby the processing load for received messages can be made low.

Further, when the road on which the ego vehicle 11 is traveling has a plurality of lanes for traveling in the ego-vehicle advancing direction, the message processing area determination unit 4a may set, as the message processing area, a traveling lane in which the ego vehicle 11 is traveling, an adjacent lane adjacent to the traveling lane, and a connecting road intersecting with or connected to the traveling lane or the adjacent lane. Moreover, when the traveling lane is an endmost lane which is the endmost lane of the road, a range obtained by extension from the endmost lane by a predetermined width may be set as a message processing area. By setting the traveling lane, the adjacent lane, and the connecting road as the message processing area, transmission messages from remote vehicles 12 traveling in a lane away from the traveling lane by at least the distance of two lanes can be excluded from the processing target, whereby the processing load for received messages can be made low.

Figure 13:
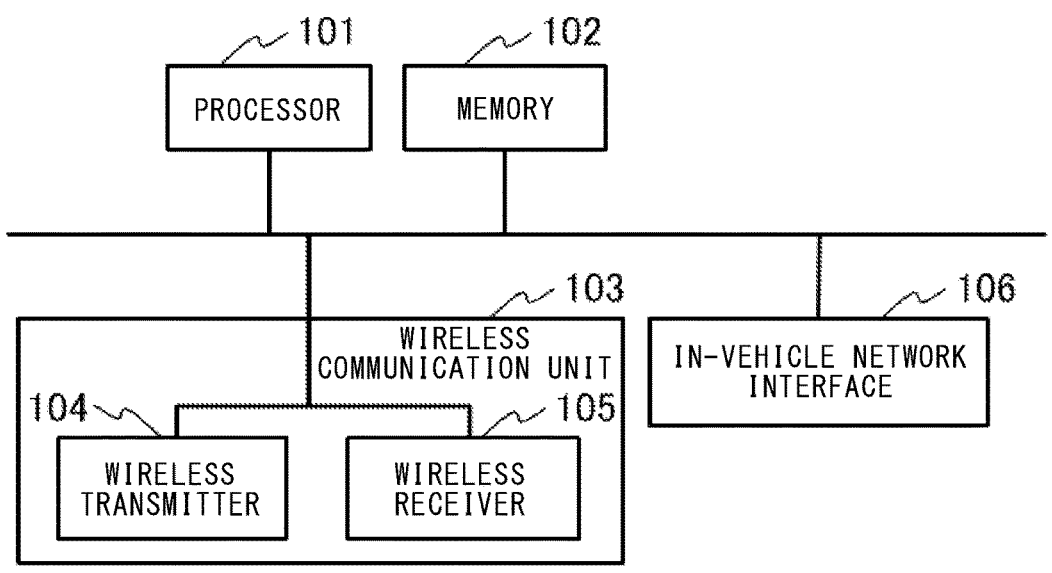
FIG. 13 is a schematic diagram showing an example of a hardware configuration of each of the vehicle-mounted communication devices according to embodiment 1 and embodiment 2.

FIG. 13 is a schematic diagram showing an example of a hardware configuration of each of the vehicle-mounted communication devices according to embodiment 1 and embodiment 2. Each of the ego-vehicle information acquisition unit 1, the message generation unit 2, the message processing area determination unit 4, 4a, the message processing necessity determination unit 5, the message process-
ing unit 6, and the map information acquisition unit 7 is
implemented by a processor 101 such as a central processing
unit (CPU) which executes a program stored in a memory
102. The memory 102 is used also as a transitory storage
device for each type of processing to be executed by the
processor 101. Also, a plurality of processing circuits may
execute the above functions in cooperation. Further, the
above functions may be realized by dedicated hardware. In
the case where the above functions are realized by dedicated
hardware, the dedicated hardware is, for example, a single
circuit, a complex circuit, a programmed processor, an
ASIC, an FPGA, or a combination thereof. The above
functions may be realized by a combination of the dedicated
hardware and software or a combination of the dedicated
hardware and firmware. The memory 102 is, for example, a
nonvolatile or volatile semiconductor memory such as a
RAM, a ROM, a flash memory, or an EPROM, a magnetic
disk, an optical disk, or a combination thereof. An in-vehicle
network interface 106 is a wired communication interface
for communication with an ECU, sensors, and the map data
storage device mounted on the ego vehicle 11. The wired
communication interface is a sensor interface, an Ethernet
(registered trademark) interface, a controller area network
(CAN) interface, or the like. As the sensors, there are, for
example, a global navigation satellite system (GNSS)
receiver, a vehicle speed sensor, an acceleration sensor, a
gyro sensor, and the like. The ego-vehicle information
acquisition unit 1 acquires the ego-vehicle information from
the ECU or the sensors through the in-vehicle network
interface 106, and the map information acquisition unit 7
acquires the map information from the map data storage
device through the in-vehicle network interface 106. The
transmission/reception unit 3 is implemented by a wireless
communication unit 103. For example, the transmission unit
31 is implemented by a wireless transmitter 104, and the
reception unit 32 is implemented by a wireless receiver 105.
The processor 101, the memory 102, the wireless commu-
nication unit 103, and the in-vehicle network interface 106
are connected to each other by a bus.

Although the disclosure is described above in terms of
various exemplary embodiments, it should be understood
that the various features, aspects, and functionality described
in one or more of the individual embodiments are not limited
in their applicability to the particular embodiment with
which they are described, but instead can be applied, alone
or in various combinations to one or more of the embodi-
ments of the disclosure.

It is therefore understood that numerous modifications
which have not been exemplified can be devised without
departing from the scope of the present disclosure. For
example, at least one of the constituent components may be
modified, added, or eliminated. At least one of the constitu-
ent components mentioned in at least one of the preferred
embodiments may be selected and combined with the con-
stituent components mentioned in another preferred embodi-
ment.

DESCRIPTION OF THE REFERENCE
CHARACTERS

1 ego-vehicle information acquisition unit
2 message generation unit
3 transmission/reception unit
4, 4a message processing area determination unit
5 message processing necessity determination unit
6 message processing unit

12

7 map information acquisition unit
10, 10a vehicle-mounted communication device
11 ego vehicle
12 remote vehicle
20a, 20b, 20c, 20d, 20e, 20f, 20g message processing area
21 congested area
21a ego-vehicle vicinity congested area
21b traveling road congested area
21c intersecting road congested area
22 expressway
31 transmission unit
32 reception unit
61 verification processing unit
62 application processing unit
101 processor
102 memory
103 wireless communication unit
104 wireless transmitter
105 wireless receiver
106 in-vehicle network interface

The invention claimed is:

1. A vehicle-mounted communication device comprising:
a receiver which receives, from remote vehicles, remote-
vehicle messages each including information about a
remote-vehicle position indicating a position of a cor-
responding one of the remote vehicles;
an ego-vehicle information acquisition circuitry which
acquires, as information about an ego vehicle, ego-
vehicle information including at least an ego-vehicle
position, an ego-vehicle speed, and an ego-vehicle
advancing direction;
a message processing area determination circuitry which
determines a message processing area on the basis of
the ego-vehicle information;
a message processing necessity determination circuitry
which
acquires the remote-vehicle messages from the
receiver,
outputs, as a selected remote-vehicle message, a
remote-vehicle message the remote-vehicle position
of which is present within the message processing
area, and
discards a remote-vehicle message the remote-vehicle
position of which is present outside the message
processing area;
a message processing circuitry which performs process-
ing on the selected remote-vehicle message outputted
from the message processing necessity determination
circuitry; and
a map information acquisition circuitry which acquires
map information about a vicinity of the ego vehicle,
wherein
the message processing area determination circuitry deter-
mines the message processing area on the basis of the
ego-vehicle information and the map information, and
the message processing area determination circuitry sets,
as the message processing area, a traveling road on
which the ego vehicle is traveling and an intersecting
road intersecting with the traveling road and excludes,
from the message processing area, a road that does not
intersect with the traveling road.

2. The vehicle-mounted communication device according
to claim 1, wherein
the message processing area determination circuitry
causes a size of the message processing area at a
portion thereof located on the ego-vehicle advancing
direction side relative to the ego vehicle to be larger than a size of the message processing area at a portion thereof located on an opposite side to the ego-vehicle advancing direction side relative to the ego vehicle, and causes a larger value of the ego-vehicle speed to lead to a larger difference between the size of the message processing area at the portion thereof located on the ego-vehicle advancing direction side relative to the ego vehicle and the size of the message processing area at the portion thereof located on the opposite side to the ego-vehicle advancing direction side relative to the ego vehicle.

3. The vehicle-mounted communication device according to claim 1, wherein the ego-vehicle information acquisition circuitry acquires weight information which is information about a total vehicle weight, the number of occupants, or a load amount of the ego vehicle, and the message processing area determination circuitry causes a size of the message processing area at a portion thereof located on the ego-vehicle advancing direction side relative to the ego vehicle to be larger than a size of the message processing area at a portion thereof located on an opposite side to the ego-vehicle advancing direction side relative to the ego vehicle, and causes a larger value of the weight information to lead to a larger difference between the size of the message processing area at the portion thereof located on the ego-vehicle advancing direction side relative to the ego vehicle and the size of the message processing area at the portion thereof located on the opposite side to the ego-vehicle advancing direction side relative to the ego vehicle.

4. The vehicle-mounted communication device according to claim 1, wherein the ego-vehicle information acquisition circuitry acquires information about a state of a road surface on which the ego vehicle is traveling, and the message processing area determination circuitry causes a size of an entirety of the message processing area obtained when the road surface is in a state of being covered with snow, wet, or unpaved to be larger than a size of an entirety of the message processing area obtained when the road surface is in a state of being dry and paved.

5. The vehicle-mounted communication device according to claim 1, wherein the map information includes information about a congested area, and, when the ego-vehicle position is outside the congested area, the message processing area determination circuitry sets, as the message processing area, a range excluding the congested area.

6. The vehicle-mounted communication device according to claim 1, wherein the map information includes information about a congested area, and the message processing area determination circuitry sets, as the message processing area, a range excluding a traveling road congested area and an intersecting road congested area, the traveling road congested area being the congested area as a range that is present on the traveling road and that is farther from the ego vehicle than a position away from the ego vehicle by a predetermined distance is, the intersecting road congested area being the congested area that is present on the intersecting road.

7. The vehicle-mounted communication device according to claim 1, wherein the message processing area determination circuitry sets, as the message processing area, a range obtained by extending each of the traveling road and the intersecting road by a predetermined width.

8. The vehicle-mounted communication device according to claim 2, wherein the ego-vehicle information acquisition circuitry acquires weight information which is information about a total vehicle weight, the number of occupants, or a load amount of the ego vehicle, and the message processing area determination circuitry causes a size of the message processing area at a portion thereof located on the ego-vehicle advancing direction side relative to the ego vehicle to be larger than a size of the message processing area at a portion thereof located on an opposite side to the ego-vehicle advancing direction side relative to the ego vehicle, and causes a larger value of the weight information to lead to a larger difference between the size of the message processing area at the portion thereof located on the ego-vehicle advancing direction side relative to the ego vehicle and the size of the message processing area at the portion thereof located on the opposite side to the ego-vehicle advancing direction side relative to the ego vehicle.

9. The vehicle-mounted communication device according to claim 2, wherein the ego-vehicle information acquisition circuitry acquires information about a state of a road surface on which the ego vehicle is traveling, and the message processing area determination circuitry causes a size of an entirety of the message processing area obtained when the road surface is in a state of being covered with snow, wet, or unpaved to be larger than a size of an entirety of the message processing area obtained when the road surface is in a state of being dry and paved.

10. The vehicle-mounted communication device according to claim 3, wherein the ego-vehicle information acquisition circuitry acquires information about a state of a road surface on which the ego vehicle is traveling, and the message processing area determination circuitry causes a size of an entirety of the message processing area obtained when the road surface is in a state of being covered with snow, wet, or unpaved to be larger than a size of an entirety of the message processing area obtained when the road surface is in a state of being dry and paved.

11. A vehicle-mounted communication device comprising:

a receiver which receives, from remote vehicles, remote-vehicle messages each including information about a remote-vehicle position indicating a position of a corresponding one of the remote vehicles;

an ego-vehicle information acquisition circuitry which acquires, as information about an ego vehicle, ego-vehicle information including at least an ego-vehicle position, an ego-vehicle speed, and an ego-vehicle advancing direction;

a message processing area determination circuitry which determines a message processing area on the basis of the ego-vehicle information;

a message processing necessity determination circuitry which acquires the remote-vehicle messages from the receiver, outputs, as a selected remote-vehicle message, a remote-vehicle message the remote-vehicle position of which is present within the message processing area, and discards a remote-vehicle message the remote-vehicle position of which is present outside the message processing area;

a message processing circuitry which performs processing on the selected remote-vehicle message outputted from the message processing necessity determination circuitry; and a map information acquisition circuitry which acquires map information about a vicinity of the ego vehicle, wherein the message processing area determination circuitry determines the message processing area on the basis of the ego-vehicle information and the map information, and, when the ego vehicle is traveling on an expressway, the message processing area determination circuitry sets, as the message processing area, the expressway and a connecting road connected to the expressway and excludes a general road from the message processing area.

12. A vehicle-mounted communication device comprising:

a receiver which receives, from remote vehicles, remote-vehicle messages each including information about a remote-vehicle position indicating a position of a corresponding one of the remote vehicles;

an ego-vehicle information acquisition circuitry which acquires, as information about an ego vehicle, ego-vehicle information including at least an ego-vehicle position, an ego-vehicle speed, and an ego-vehicle advancing direction;

a message processing area determination circuitry which determines a message processing area on the basis of the ego-vehicle information;

a message processing necessity determination circuitry which acquires the remote-vehicle messages from the receiver, outputs, as a selected remote-vehicle message, a remote-vehicle message the remote-vehicle position of which is present within the message processing area, and discards a remote-vehicle message the remote-vehicle position of which is present outside the message processing area;

a message processing circuitry which performs processing on the selected remote-vehicle message outputted from the message processing necessity determination circuitry; and a map information acquisition circuitry which acquires map information about a vicinity of the ego vehicle, wherein the message processing area determination circuitry determines the message processing area on the basis of the ego-vehicle information and the map information, and, when a road on which the ego vehicle is traveling has a central reservation, the message processing area determination circuitry sets, as the message processing area, an advancing-direction lane for traveling in the ego-vehicle advancing direction on the road on which the ego vehicle is traveling and a connecting road intersecting with or connected to the advancing-direction lane and excludes, from the message processing area, an opposite lane relative to the road on which the ego vehicle is traveling.

* * * * *